3,325,523
N,N-DI-LOWER ALKYLHYDROXYLAMINE SALTS
Harry E. Albert, Lafayette Hill, Pa., assignor to Pennsalt Chemicals Corporation, Philadelphia, Pa., a corporation of Pennsylvania
No Drawing. Filed Oct. 30, 1963, Ser. No. 319,991
5 Claims. (Cl. 260—404)

This invention relates to a novel class of compounds useful for preventing the undesired polymerization of aromatic vinyl compounds.

The novel compositions of the invention are those N,N-di-lower alkylhydroxylamine salts wherein the salt is derived from aliphatic acid containing from three to eighteen carbon atoms. Thus, the compounds will have a structural formula corresponding to the following:

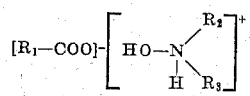

wherein $R_1$ is alkyl containing from two to seventeen carbon atoms and $R_2$ and $R_3$ are lower alkyl (i.e. containing from one to six carbon atoms).

It will be understood in discussing this invention that the aliphatic carboxylic acid salts will include any, N,N-di-lower alkylhydroxylamine, i.e. a hydroxylamine having attached to the nitrogen atom two alkyl groups containing from one to six carbon atoms; e.g., N,N-dimethylhydroxylamine; N,N-diethylhydroxylamine; N,N-dipropylhydroxylamine; N,N-diisopropylhydroxylamine; N,N-diamylhydroxylamine; N,N-n-propylmethylhydroxylamine; N,N-di-hexylhydroxylamine and the like. Likewise, it will be understood that the N,N-dialkylhydroxylamine salts of the invention may be used to inhibit the undesired polymerization of vinyl compounds such as styrene, divinylbenzene, a-methylstyrene, ring methylated styrene, ethylvinylbenzene, vinylnaphthalene, ring chlorinated styrenes, etc.

The aliphatic carboxylic acid salts of the N,N-dialkylhydroxylamines will, as indicated, be those aliphatic carboxylic acid (e.g. fatty acids) containing from three to 18 carbon atoms and will include propionic, butyric, valeric, hexanoic, octanoic, nonanoic, decanoic, undecanoic, lauric, palmitic, stearic acids, and the like.

When used to inhibit the premature polymerization of the vinyl compounds, the compounds will be used preferably at a concentration of about 0.1 to 2% by weight of the vinyl compound. However, it is to be understood that lower concentrations may also be employed, as well as higher concentrations, and the general operable range will vary from between about 0.001 to 5% by weight of the vinyl compounds to be stabilized. The compounds of the invention are also useful as stopping agents for emulsion polymerization systems; e.g. styrene-butadiene polymerization systems used for the manufacture of synthetic rubber. In such applications, the salts wherein the aliphatic acid portion of the compound contains above about four carbon atoms is to be preferred because of the increased solubility in the olefinic entities of the system which results in improved contact and stopping action. Another advantage for these higher molecular weight N,N-di-lower alkylhydroxylamine salts lies in their ability to inhibit polymerization in liquid systems but permit polymerization to occur in a vapor phase system which might be derived from the inhibited liquid system. This effect is probably due to the limited volatility of the higher molecular weight salts of the invention.

The compounds of the invention are made readily by mixing essentially stoichiometric amounts of the N,N-di-lower alkylhydroxylamine (usually as a concentrated aqueous solution) with the free acid, usually with warming and stirring. The products are waxy solids or liquids at room temperature.

The following examples will serve to further illustrate the invention:

*Example 1.*—N,N-diethylhydroxylamine propionate

With stirring, 93 g. (1.25 moles) of propionic acid was added to an aqueous solution of 126 g. (1.25 moles) of 87.8% N,N-diethylhydroxylamine and then heated for one-half hour at 90–100° C. on a steam bath to yield the product which was a liquid at room temperature.

*Example 2.*—N,N-diethylhydroxylamine stearate

A mixture of 92 g. (1.0 mole) of 92.8% N,N-diethylhydroxylamine and 285 g. (1.0 mole) of stearic acid was warmed and stirred at 45–50° C. until all the acid had melted. The resulting product was a liquid which eventually solidified to a light brown solid having a melting point slightly above room temperature.

*Example 3.*—N,N-diethylhydroxylamine laurate

A mixture of 100 g. (0.5 mole) of purified lauric acid (M.P. 42–43° C.) and 44.5 g. (0.5 mole) of 99.7% N,N-diethylhydroxylamine was warmed in a beaker to 40° C. to completely dissolve the acid. The product was a yellow liquid which assayed 96.98% diethylhydroxylamine laurate by nonaqueous titration with 0.1 N $HClO_4$. It analyzed 4.92% nitrogen; the theoretical value is 4.85% nitrogen.

*Example 4.*—N,N-di-n-butylhydroxylamine laurate

A mixture of 6.2 g. (0.04 mole) of 92.5% N,N-di-n-butylhydroxylamine and purified lauric acid (M.P. 42–43° C.) was warmed slightly in a beaker until the acid had melted to yield a light brown liquid product.

In order to illustrate the effectiveness of the invention, the following examples are given:

*Example 5*

The polymerization of styrene containing various N,N-dialkylhydroxylamine salts and a control of styrene containing no inhibitor were compared by means of dilatometric experiments. The dilatometer employed was of the stopcock type with a bulk of 25 ml. capacity and an 80 cm. capillary stem of 2.0 mm. bore. The open capillary top was plugged with a small glass bead to eliminate any evaporation of the monomer. In order to insure that it was free of inhibitor and any impurities, the styrene employed was distilled and maintained under refrigeration prior to polymerization. The styrene charge was drawn into the dilatometer by suction through a tube extending below the bottom of the styrene. The dilatometer was then placed in a mineral oil bath so that the bulb and 5 cm. of the capillary stem were submerged below the oil level. The oil bath was then heated to raise the temperature of the styrene to 120 ±0.2° C. Approximately 15 minutes were required for the solution to reach thermal equilibrium upon immersion of the dilatometer in the thermostatically-controlled bath.

Initially upon heating, the volume of the styrene in the capillary tube rises to give a given level. Thereafter, as polymerization begins and continues, the level of liquid in the capillary tube progressively falls. Thus, the decrease in volume of the liquid in the capillary tube provides a direct measure of the amount of polymerization which is occurring, the smaller the decrease, the greater the inhibition. The following tables indicate the compounds tested and the results obtained.

TABLE I.—STABILIZATION EFFECTS OF 0.5% BY WEIGHT OF N,N-DIETHYLHYDROXYLAMINE SALTS ON STYRENE

|   | Compound | Decrease in height in 2 hours at 120° C. | |
|---|---|---|---|
|   |   | Cm. | Percent of control |
| A | Control | 31.3 | |
|   | Diethylhydroxylamine | 2.3 | 7.35 |
|   | Diethylhydroxylamine propionate | 0.7 | 2.10 |
| B | Control | 39.8 | |
|   | Diethylhydroxylamine | 6.2 | 15.6 |
|   | Diethylhydroxylamine hydrochloride | 7.0 | 17.6 |
|   | Diethylhydroxylamine benzoate | 30.0 | 75.4 |
|   | Diethylhydroxylamine salicylate | 18.2 | 45.7 |
|   | Diethylhydroxylamine stearate | 1.7 | 4.3 |

It is evident from the above Table I that the aliphatic acid salts of diethylhydroxyamine are markedly superior polymerization inhibitors to the diethylhydroxylamine, its hydrochloride, or its aromatic carboxylic acid salts.

*Example 6*

Evaluation of the two lauric acid salts in accord with the procedure of Example 5 gave the following results:

| Compound | Decrease in height in 2 hours at 120° C. | |
|---|---|---|
|   | Cm. | Percent of control |
| Control | 71.0 | |
| N,N-diethylhydroxylamine laurate | 7.8 | 11.0 |
| N,N-di-n-butylhydroxylamine laurate | 3.3 | 4.6 |

In using the stabilizers in accordance with the present invention, the N,N-di-lower alkylhydroxylamine is generally first dissolved in uninhibited styrene to prepare a stock solution. Aliquots of this stock solution are then used as an additive to the styrene to be stabilized. In this way, the stabilizers are easily handled, stored and transported.

It will be understood that numerous changes and variations may be made from the above description and examples without departing from the spirit and scope of the invention.

I claim:

1. N,N-di-lower alkylhydroxylamine salts having the structure

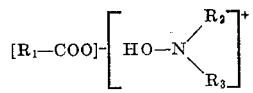

wherein $R_1$ is alkyl containing from 2 to 17 carbon atoms, and $R_2$ and $R_3$ are alkyl containing from 1 to 6 carbon atoms.

2. N,N-diethylhydroxylamine propionate.
3. N,N-diethylhydroxylamine laurate.
4. N,N-diethylhydroxylamine stearate.
5. N,N-dibutylhydroxylamine laurate.

No references cited.

CHARLES B. PARKER, *Primary Examiner.*

A. H. SUTTO, *Assistant Examiner.*